US012240007B2

(12) United States Patent
Freier

(10) Patent No.: US 12,240,007 B2
(45) Date of Patent: Mar. 4, 2025

(54) SELF-CLEANING MISTING NOZZLE

(71) Applicant: Kohler Co., Kohler, WI (US)

(72) Inventor: Donald P. Freier, Sheboygan, WI (US)

(73) Assignee: KOHLER CO., Kohler, WI (US)

(*) Notice: Subject to any disclaimer, the term of this patent is extended or adjusted under 35 U.S.C. 154(b) by 633 days.

(21) Appl. No.: 16/826,420

(22) Filed: Mar. 23, 2020

(65) Prior Publication Data

US 2020/0306783 A1 Oct. 1, 2020

Related U.S. Application Data

(60) Provisional application No. 62/823,208, filed on Mar. 25, 2019.

(51) Int. Cl.
*B05B 15/525* (2018.01)
*A61H 33/00* (2006.01)

(52) U.S. Cl.
CPC ........ *B05B 15/525* (2018.02); *A61H 33/6068* (2013.01)

(58) Field of Classification Search
CPC .............................. B05B 15/525; A61H 33/06
USPC ...................................................... 4/525, 535
See application file for complete search history.

(56) References Cited

U.S. PATENT DOCUMENTS

| | | | | | |
|---|---|---|---|---|---|
| 1,879,012 | A | | 9/1932 | Armstrong | |
| 2,092,519 | A | * | 9/1937 | McLean | B05B 1/34 239/118 |
| 2,093,444 | A | * | 9/1937 | Hubbard | B05B 15/5225 239/524 |
| 2,097,696 | A | * | 11/1937 | MacDonald | B05B 7/066 239/118 |
| 2,140,188 | A | * | 12/1938 | Marsh | B05B 7/1254 239/118 |
| 2,311,018 | A | * | 2/1943 | Bahnson, Jr. | B05B 7/066 239/118 |
| 2,362,102 | A | * | 11/1944 | Simon | B05B 15/5225 239/533.1 |
| 2,803,499 | A | * | 8/1957 | Goyette | B05B 15/525 239/524 |
| 3,059,857 | A | * | 10/1962 | Friant | B60S 1/528 239/117 |
| 4,300,556 | A | * | 11/1981 | Ochi | A61H 33/12 607/82 |
| 4,422,574 | A | * | 12/1983 | Mancuso, Jr. | A23P 20/15 239/118 |

(Continued)

*Primary Examiner* — Joseph A Greenlund
(74) *Attorney, Agent, or Firm* — FOLEY & LARDNER LLP

(57) ABSTRACT

A spray nozzle for a steam generator of a shower steam system includes a housing defining a longitudinal bore extending to an outlet, and an atomizing member positioned adjacent the outlet. An elongated member is coupled to the housing in the longitudinal bore, and defines a pin at an end thereof. A body is slidably coupled to the housing in the longitudinal bore, and includes an opening extending there-through. A biasing member is configured to bias the body against the elongated member by a biasing force such that the elongated member extends through the opening. The body is configured to move axially away from the elongated member toward the atomizing member in response to a pressure of a flow of water being above a threshold value so as to overcome the biasing force and allow the flow of water to pass through the opening to the atomizing member.

18 Claims, 4 Drawing Sheets

(56) References Cited

U.S. PATENT DOCUMENTS

| | | | | | |
|---|---|---|---|---|---|
| 4,629,120 | A * | 12/1986 | Diamond | B05B 1/3046 | 222/149 |
| 5,119,991 | A * | 6/1992 | Divers | B05B 15/5225 | 239/117 |
| 5,765,752 | A * | 6/1998 | Herr | G05D 22/02 | 239/117 |
| 5,893,520 | A * | 4/1999 | Elkas | B05B 1/265 | 239/597 |
| 5,927,329 | A * | 7/1999 | Yie | B05B 1/3046 | 251/30.01 |
| 6,027,030 | A * | 2/2000 | Buijsse | B05B 7/2489 | 236/44 C |
| 6,481,644 | B1 * | 11/2002 | Olsen | B05B 1/3073 | 239/524 |
| 7,124,964 | B2 * | 10/2006 | Bui | B05B 1/32 | 239/533.14 |
| 8,327,473 | B2 * | 12/2012 | Matsubara | A61H 33/065 | 4/525 |
| 8,915,453 | B1 * | 12/2014 | Sherry | C02F 1/048 | 239/533.1 |
| 2009/0056009 | A1 * | 3/2009 | Matsubara | A61H 33/063 | 4/524 |
| 2020/0306783 | A1 * | 10/2020 | Freier | B05B 15/5225 | |
| 2020/0368104 | A1 * | 11/2020 | Freier | A61H 33/028 | |

* cited by examiner

SELF-CLEANING MISTING NOZZLE

CROSS-REFERENCE TO RELATED PATENT APPLICATION

This application claims the benefit of and priority to U.S. Provisional Application No. 62/823,208, filed Mar. 25, 2019, the entire disclosure of which is hereby incorporated by reference herein.

BACKGROUND

The present disclosure relates generally to shower systems. More specifically, the present disclosure relates to a self-cleaning spray nozzle for a steam generator of a shower steam system.

SUMMARY

At least one embodiment relates to a shower steam system including a steam generator and a spray nozzle. The spray nozzle is fluidly coupled to the steam generator and includes a housing, an elongated member, a body, and a biasing member. The housing defines a longitudinal bore extending to an outlet, and includes an atomizing member positioned adjacent the outlet. The elongated member is coupled to the housing in the longitudinal bore, and defines a pin at an end thereof. The body is slidably coupled to the housing in the longitudinal bore, and includes an opening extending therethrough. The biasing member is configured to bias the body against the elongated member by a biasing force such that the elongated member extends through the opening. The body is configured to move axially away from the elongated member toward the atomizing member in response to a pressure of a flow of water being above a threshold value so as to overcome the biasing force and allow the flow of water to pass through the opening to the atomizing member.

Another embodiment relates to a shower steam system including a steam generator and a spray nozzle. The spray nozzle is coupled to the steam generator and includes a housing, an elongated member, a body, and a biasing member. The spray nozzle is configured to receive a flow of water from a water source and to provide an atomized spray of water to the steam generator. The housing defines an inlet configured to receive the flow of water, an outlet configured to provide the atomized spray of water, and a longitudinal bore extending between the inlet and the outlet. The housing includes an atomizing member positioned adjacent the outlet. The elongated member is coupled to the housing in the longitudinal bore, and defines a pin at an end thereof. The body is slidably coupled to the housing in the longitudinal bore, and includes an opening extending therethrough. The biasing member is configured to bias the body against the elongated member by a biasing force such that the elongated member extends through the opening. The body is configured to move axially away from the elongated member toward the atomizing member in response to a pressure of the flow of water being above a threshold value to overcome the biasing force and allow the flow of water to pass through the opening.

Another embodiment relates to a spray nozzle for a steam generator of a shower steam system. The spray nozzle includes a housing defining a longitudinal bore extending to an outlet, and an atomizing member positioned adjacent the outlet. An elongated member is coupled to the housing in the longitudinal bore, and defines a pin at an end thereof. A body is slidably coupled to the housing in the longitudinal bore, and includes an opening extending therethrough. A biasing member is configured to bias the body against the elongated member by a biasing force such that the elongated member extends through the opening. The body is configured to move axially away from the elongated member toward the atomizing member in response to a pressure of a flow of water being above a threshold value so as to overcome the biasing force and allow the flow of water to pass through the opening to the atomizing member.

This summary is illustrative only and is not intended to be in any way limiting.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Generally speaking, a shower steam system can include a steam generator to provide steam to a shower environment, so as to provide an enhanced user experience. The steam generator can include a spray nozzle to inject water into the steam generator as an atomized spray to produce steam, which can be mixed with air prior to being introduced into the shower environment. Most spray nozzles, however, can be prone to clogging over time, which can affect the amount of steam generated for the shower, thereby impacting the temperature in the shower environment.

Referring generally to the FIGURES, disclosed herein is a self-cleaning spray nozzle for a steam generator of a shower steam system. The spray nozzle includes a movable body and a fixed pin, where the body is normally biased toward the pin such that the pin is received through an opening of the nozzle when water pressure in the nozzle is below a threshold value. When water pressure in the nozzle is at or above the threshold value, the body moves away from the pin to provide a flow of water through the body to an atomizing member, so as to provide an atomized spray of water into the steam generator. In this way, the movable body and the pin can function to automatically clean the opening of the spray nozzle. This can, advantageously, help to reduce temperature variations in the shower environment, minimize maintenance of the spray nozzle, and prolong the useful life of the system.

Although the following disclosure relates specifically to the application of a self-cleaning spray nozzle to a steam generator of a shower steam system, it should be appreciated that the disclosed spray nozzle may be employed in a variety of other types of systems that utilize an atomized spray of fluid, such as a heated air bath system (e.g., a "bubble massaging" bath system, spa, etc.). According to another exemplary embodiment, the disclosed spray nozzle can be coupled with a solenoid for turning the water on and off, and may be configured to work without an atomizing function in, for example, a standard steam generator that includes a tank.

Figure 1:
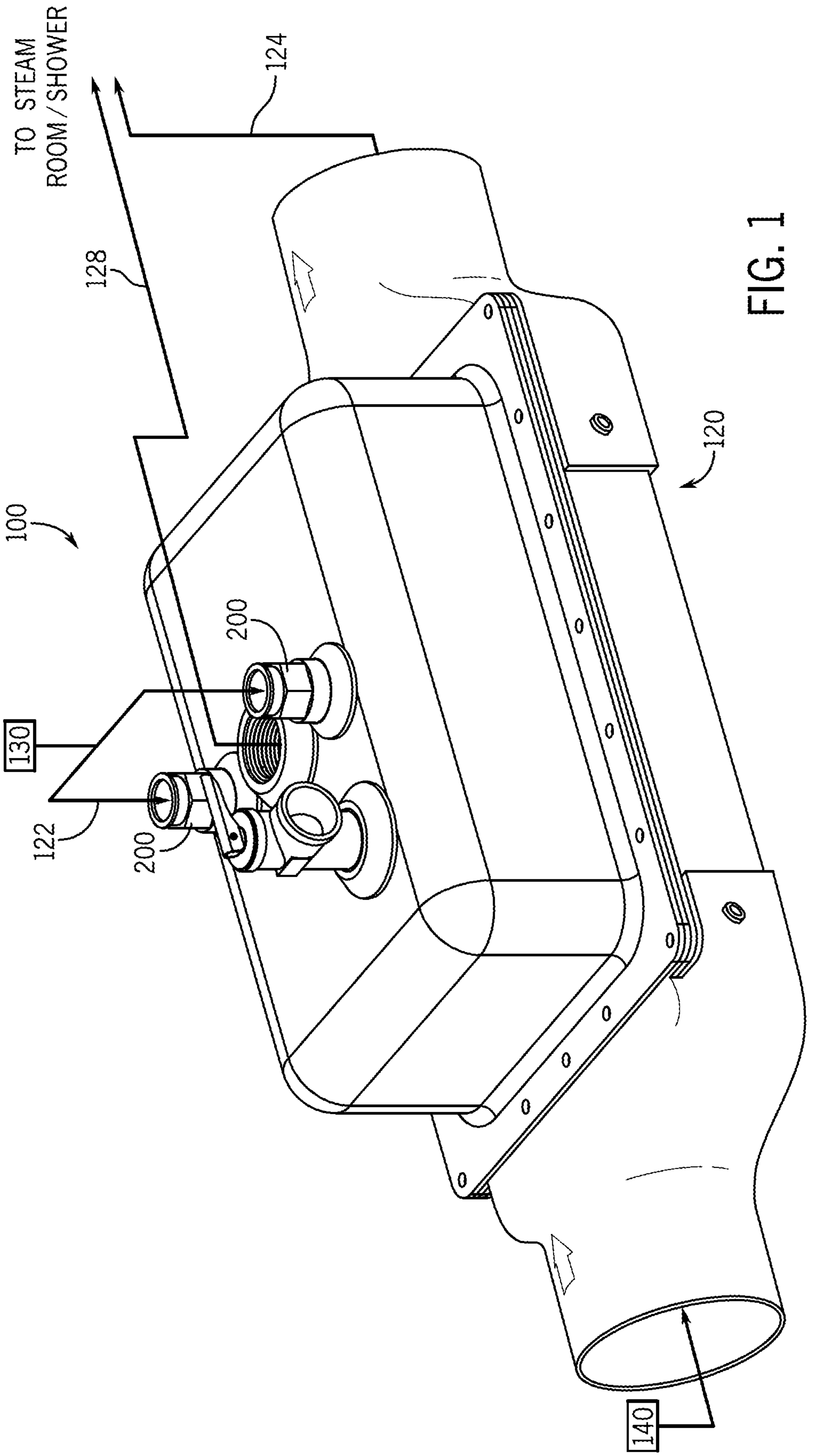
FIG. 1 is a perspective view of a steam generator for a shower steam system according to an exemplary embodiment.
Figure 2:
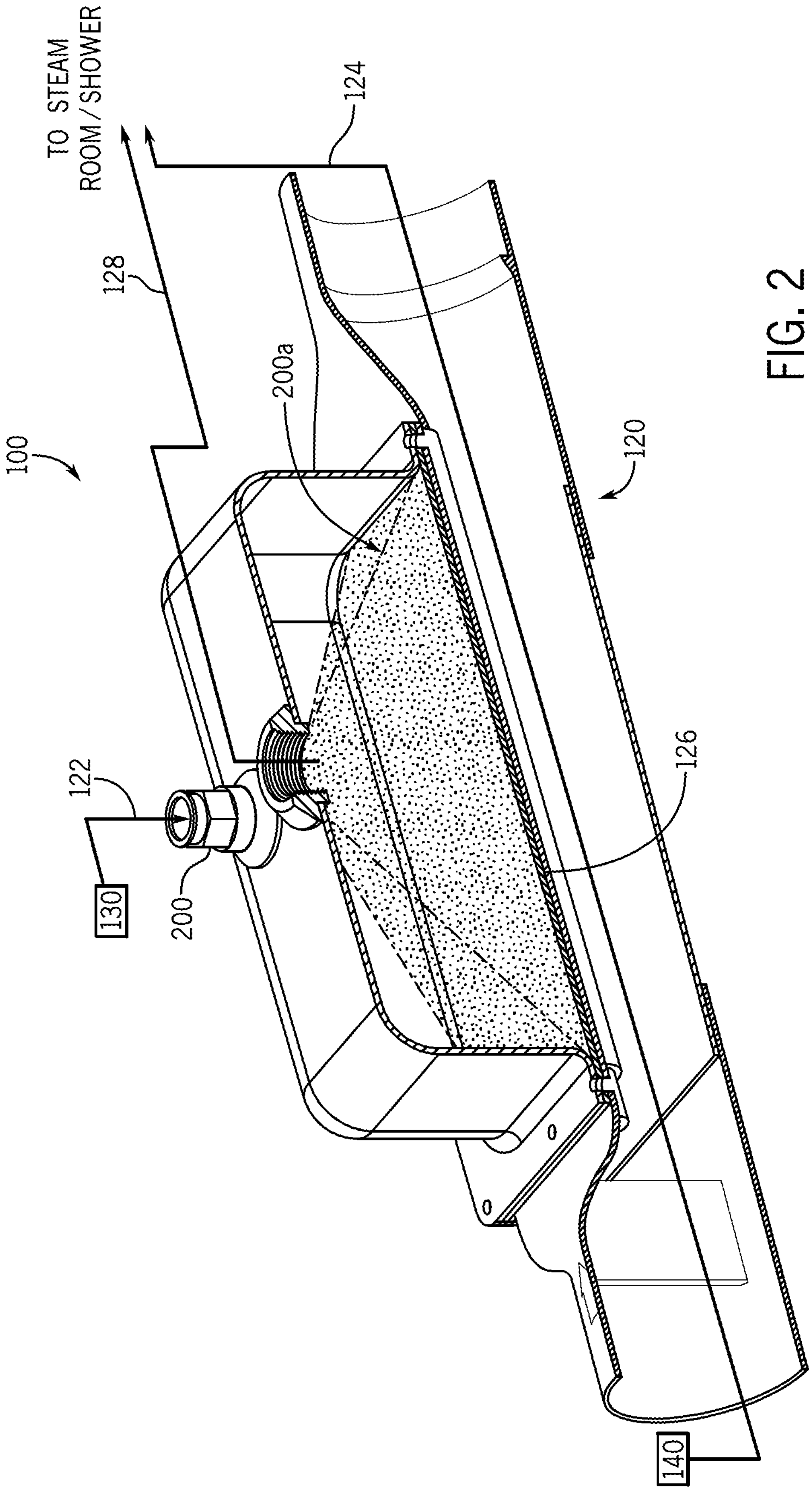
FIG. 2 is a cross-sectional view of the steam generator of FIG. 1.

Referring to FIGS. 1-2, a shower steam system 100 is shown according to an exemplary embodiment. The shower steam system 100 includes a steam generator 120 that may be fluidly coupled to a shower steam room or similar type of shower environment. The steam generator 120 is fluidly coupled to a water source 130, such as a household water supply, along a first flow path 122. The steam generator 120 is also fluidly coupled to an air supply source 140, such as a blower motor, along a second flow path 124. One or more spray nozzles 200 are fluidly coupled to the steam generator 120 and are in fluid communication with the water source 130. As shown in FIG. 2, each spray nozzle 200 is configured to receive a flow of water from the water source 130 along the first flow path 122, and to deliver the flow of water as an atomized spray 200*a* to a cavity 120*a* of the steam generator 120, where the atomized spray 200*a* can be heated by a heat source 126 to produce steam. The steam can be delivered along a third flow path 128 from the steam generator 120 to a steam room where it can be combined with the air flow from the second flow path 124 for use in the shower environment, so as to provide for an enhanced user experience.

Figure 4:
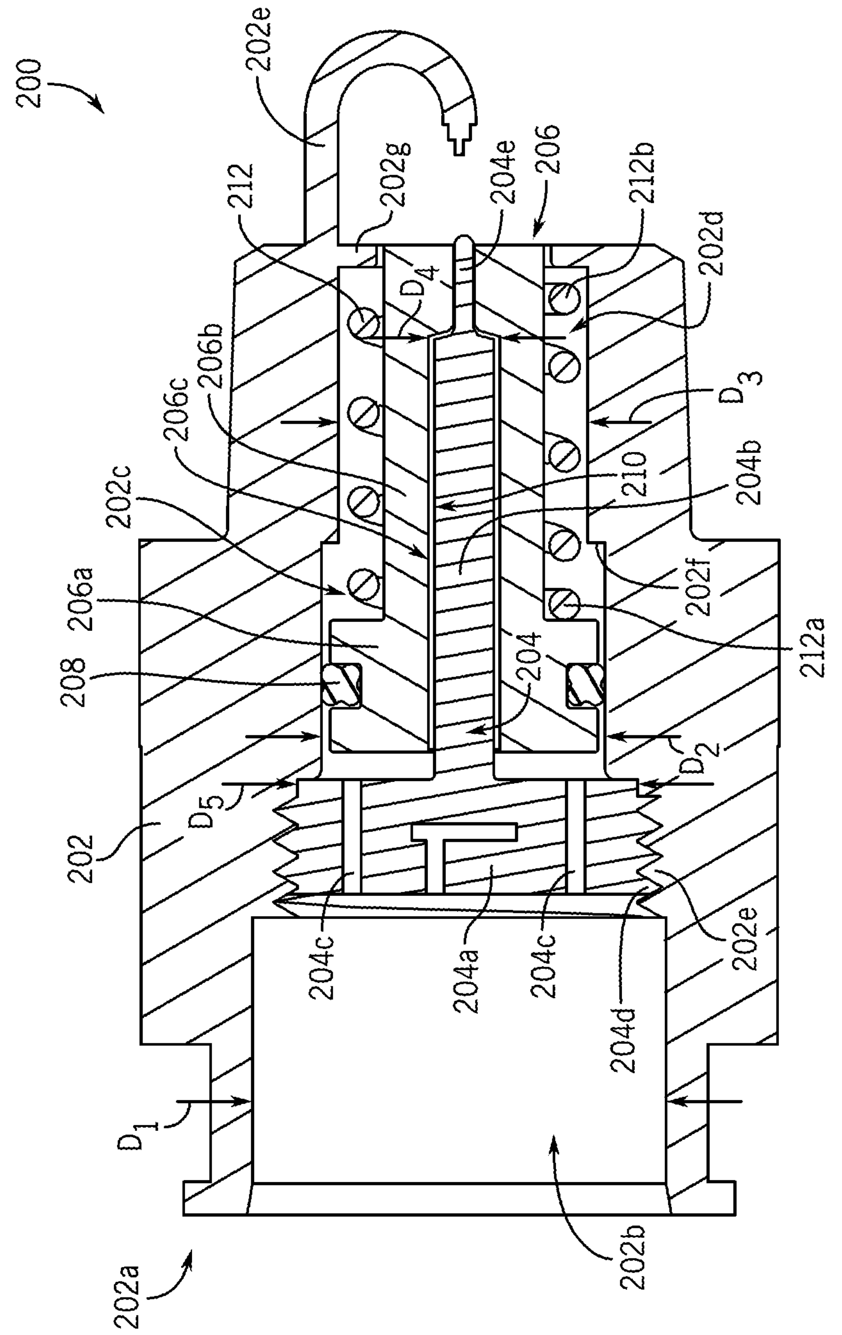
FIG. 4 is a cross-sectional view of the spray nozzle of FIG. 3 in a first state of operation.
Figure 3:
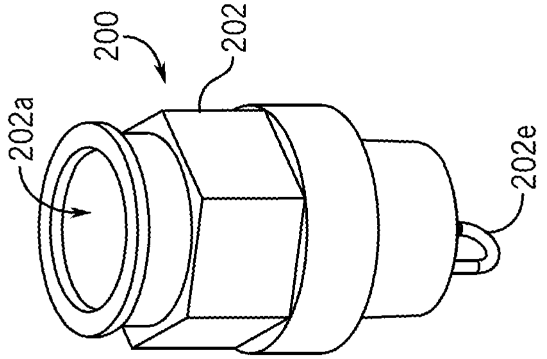
FIG. 3 is a perspective view of a spray nozzle for the steam generator of FIG. 1.
Figure 5:
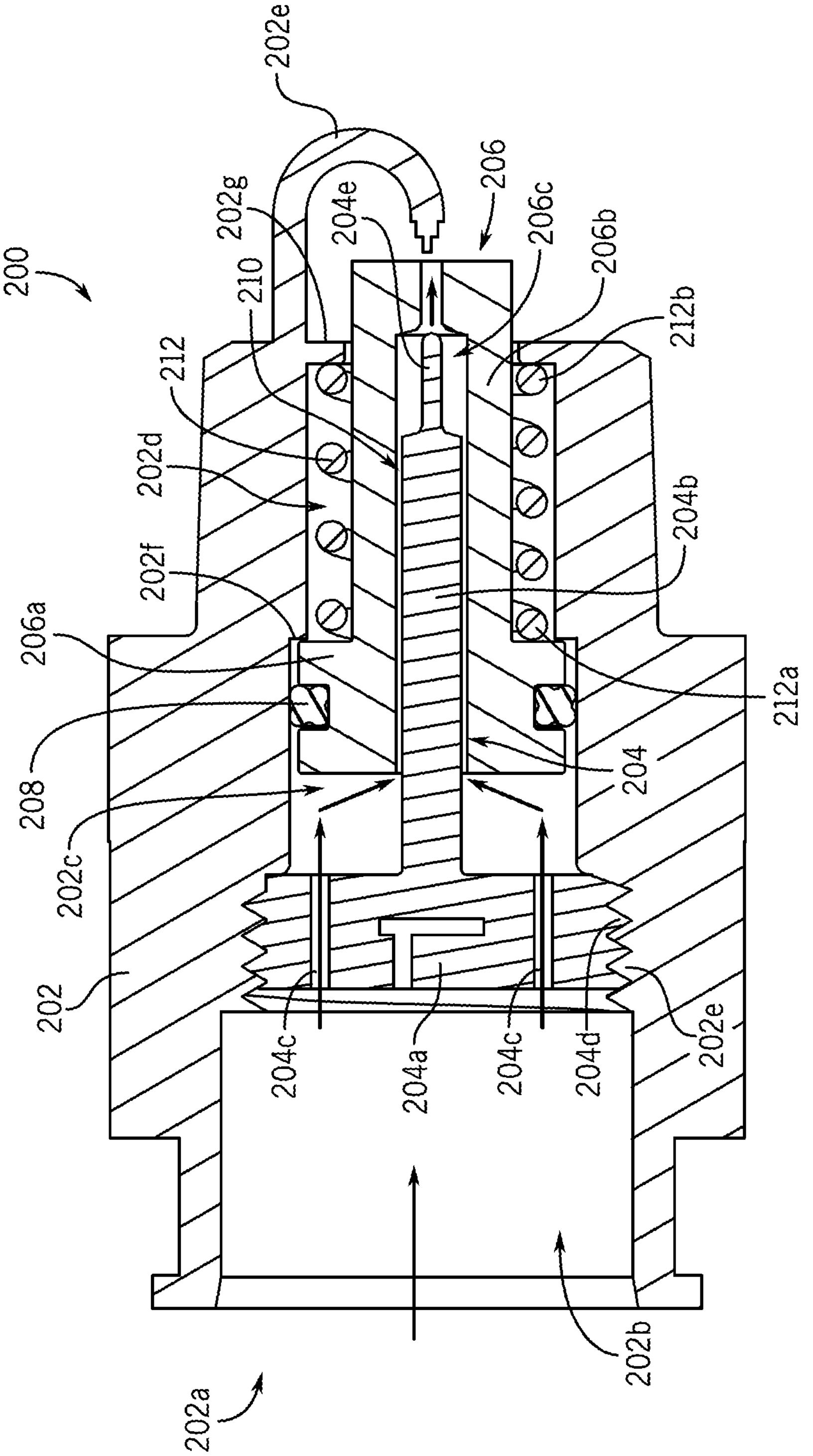
FIG. 5 is a cross-sectional view of the spray nozzle of FIG. 3 in a second state of operation.

Referring to FIGS. 3-5, the spray nozzle 200 includes a housing 202. The housing 202 has a generally hollow cylindrical shape that defines a longitudinal bore 202*a* having an inlet portion 202*b*, an intermediate portion 202*c*, and an outlet portion 202*d* opposite the inlet portion 202*b*. The inlet portion 202*b* has a first diameter D1, the intermediate portion 202*c* has a second diameter D2 that is less than the first diameter D1, and the outlet portion 202*d* has a third diameter D3 that is less than the second diameter D2. The housing 202 further includes an atomizing member 202*e* located in front of the outlet portion 202*d* at an outer portion of the housing 202. The atomizing member is configured to atomize a flow of water received from within the spray nozzle 200. The housing 202 may include an external fastening arrangement, such as threads, press-fit features, bayonet features, or other arrangements for detachably coupling the spray nozzle 200 to the steam generator 120 at the first flow path 122.

Still referring to FIGS. 3-5, the spray nozzle 200 further includes an elongated member 204 detachably coupled to an inner wall of the housing 202 within the longitudinal bore 202*a* at the intermediate portion 202*c*. The elongated member 204 is configured to be in a fixed position relative to the housing 202. The elongated member 204 includes a first portion 204*a* and a second portion 204*b* extending axially away from the center of the first portion 204*a*. The first portion 204*a* has a generally cylindrical shape and defines a plurality of channels 204*c* extending axially through the first portion 204*a*. The plurality of channels 204*a* are configured to direct fluid received at the inlet portion 202*b* (e.g., from the water supply source 130, etc.) toward the intermediate portion 202*c*. According to an exemplary embodiment, the first portion 204*a* includes four channels 204*c* positioned annularly about the first portion 204*a*. According to other exemplary embodiments, the first portion 204*a* includes more or fewer than four channels 204*c*. According to the exemplary embodiment shown, the channels 204*c* each have the same diameter and are positioned equidistant relative to each other, so as to provide a more balanced distribution of fluid through the first portion 204*a*, the details of which are described below.

The first portion 204*a* further includes a fastening arrangement, shown as threads 204*d*, located on an outer circumferential surface of the first portion 204*a*, although other fastening arrangements may be used according to other exemplary embodiments (e.g., press-fit features, snaps, bayonet features, etc.). The elongated member 204 is configured to be threadably coupled to corresponding inner threads 202*e* located on an inner surface of the housing 202 by the threads 204*d*. In the embodiment shown, the first portion 204*a* is threadably coupled at the intermediate portion 202*c*, such that the second portion 204*b* extends axially away from the inlet portion 202*b*. The first portion 204*a* may include internal features to facilitate coupling of the elongated member 204 to the housing 202, such as an opening or slot to receive a standard tool (e.g., flathead, Philips, torx, etc.) for threadably coupling the elongated member 204 to the housing 202 through the inlet portion 202*b*.

Still referring to FIGS. 3-5, the second portion 204*b* of the elongated member 204 has a generally cylindrical shape and extends axially away from the first portion 204*a* through the center of the longitudinal bore 202*a*. The second portion 204*b* has a fourth diameter D4 that is less than a fifth diameter D5 of the first portion 204*a*, such that the second portion 204*b* does not interfere with the channels 204*c* extending through the first portion 204*a*. The second portion 204*b* includes a pin 204*e* extending axially away from a distal end of the second portion 204*b*. As shown, the distal end of the second portion 204*b* tapers gradually inward toward the pin 204. The pin 204 is configured to be received in a complementary opening of a body 206 to provide a self-cleaning function of the spray nozzle, the details of which are discussed below.

Referring to FIGS. 3-5, the spray nozzle 200 further includes a body 206 slidably coupled to the housing 202 in the longitudinal bore 202*a*. The body 206 includes a flange 206*a* and an elongated portion 206*b* extending axially away from the flange 206*a*. The flange 206*a* has a generally cylindrical shape, and is configured to slidably engage an inner surface of the housing 202*a* along the intermediate portion 202*c*. The flange 206*a* further includes a circumferential channel for receiving a seal, shown as an O-ring 208, to help to create a substantially watertight seal between the flange 206*a* and the housing 202*a*. In addition, the O-ring 208 can help to permit relative translational movement between the flange 206*a* and the housing 202 during operation of the spray nozzle 200, as discussed in greater detail below.

Still referring to FIGS. 3-4, the elongated portion 206*b* has a generally hollow cylindrical shape that defines an opening 206*c*. The opening 206*c* extends axially through the entire length of the body 206. The opening 206*c* is defined by an inner surface having a surface profile that is complementary to an outer surface profile of the second portion 204*b* and an outer surface profile of the pin 204*e*. In this way, the second portion 204*b* and the pin 204*e* can be received in the opening 206*c*, so as to help to clear the opening 206*c* of any obstructions or debris that may accumulate therein. The opening 206*c* is slightly larger than the outer surface profile of the second portion 204*b*, so as to define a fluid channel 210 between the inner surface of the body 206 that defines the opening 206*c* and the second portion 204*b*. However, the portion of the opening 206*c* that is complementary to the pin 204*e* is substantially the same as the outer surface profile of the pin 204*e*, such that there is substantially no gap or space between the elongated portion 206*b* and the pin 204*e* when the pin 204*e* is received in the complementary portion (i.e., at a normally closed position of the spray nozzle 200 shown in FIG. 4). In this way, the pin 204*e* can act to clear a substantial area of the opening 206*c* that corresponds to the pin 204*e*.

The fluid channel 210 extends circumferentially about the second portion 204*b* to permit fluid to flow along the length of the opening 206 between the second portion 204*b* and the elongated portion 206*b*. The body 206 is configured to move relative to the second portion 204*b* and the pin 204*e* from a normally closed position, shown in FIG. 4, to an open position, shown in FIG. 5, so as to permit fluid to flow past the pin 204*e* and through the remainder of the opening 206*c* (represented by arrows in FIG. 5). This movement of the body 206 causes a distal end of the elongated portion 206*b* to extend outwardly past the outlet portion 202*c*, such that the distal end is substantially flush with a portion of the atomizing member 202*e*. The reduction in diameter between the intermediate portion 202*b* and the outlet portion 202*c* of the housing 202 defines a step or wall 202*f* that is configured to limit the axial movement of the body 206 within the longitudinal bore 202*a* to the open position shown in FIG. 4. In this way, water flowing through the opening 206*c* can properly impinge on the atomizing member 202*e*, so as to provide an atomized spray of water.

A biasing member, shown as a spring 212, is disposed around the elongated portion 206*b* between housing 202 and the body 206. A first end 212*a* of the spring 212 is engaged with a surface of the flange 206*a* and a second end 212*b* of the spring 212 is engaged with a lip 202*g* of the housing 202 adjacent the outlet portion 202*d* within the longitudinal bore 202*a*. The spring 212 has a length sufficient to bias the body 206 against the elongated member 204 to the normally closed position shown in FIG. 4, such that the pin 204*e* is received through the complementary portion of the opening 206*c*.

For example, when water pressure within the fluid channel 210 is below a threshold value, the spring 212 will act to bias the body 206 against the second portion 204*b* of the elongated member 204, as shown in FIG. 4. When the water pressure within the fluid channel 210 is at or above the threshold value, such as during operation of the steam system, the water pressure will overcome the biasing force of the spring 212, which will cause the body 206 to move axially away from the second portion 204*b* to an open position shown in FIG. 5, so as to allow water to flow through the entire opening 206*c* to impinge on the atomizing member 202*e* (represented by arrows in FIG. 5). When the water pressure within the fluid channel 210 falls below the threshold value, such as when the bath system 100 is no longer being operated, the spring 212 will bias the body 206 back to the normally closed position shown in FIG. 4, where the pin 204*e* is received through the complementary portion of the opening 206*c*. In this manner, the pin 204*e* can function to automatically clear the opening 206*c*, which can, advantageously, help to maintain a temperature within the shower environment and prolong the useful life of the system.

Referring to FIGS. 4-5, a method of operating the spray nozzle 200 within the bath system 100 will now be described. A flow of water is received at the inlet portion 202*b* of the spray nozzle 200 from a water supply source 120 at a first flow rate. The flow of water can pass through one or more of the plurality of channels 204*c* of the first portion 204*a* and into the fluid channel 210 between the body 206 and the second portion 204*b*. When the pressure of the flow of water is at or above a threshold value in the fluid channel 210, the body 206 moves axially away from the second portion 204*b* (represented by arrow "A") due to the water pressure overcoming the biasing force of the spring 212, such that the distal end of the body 206 is positioned substantially flush with a portion of the atomizing member 202*e*. The flow of water can accelerate through the opening 206*c* at a second flow rate that is greater than the first flow rate to impinge on the atomizing member 202*e* and produce an atomized spray of water to create steam in the steam generator 120. When the pressure of the flow of water drops below the threshold value, the body 206 is biased to a normally closed position in which the pin 204*e* is received in the complementary portion of the opening 206*c*, so as to automatically clear the opening 206*c*.

The disclosed spray nozzle can provide an automatic self-cleaning function as part of a shower steam system. This can, advantageously, help to reduce temperature variations in the shower environment, minimize maintenance of the spray nozzle, and prolong the useful life of the system.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to suggest that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above.

It is important to note that the construction and arrangement of the assembly as shown in the various exemplary embodiments is illustrative only. Additionally, any element disclosed in one embodiment may be incorporated or utilized with any other embodiment disclosed herein.

What is claimed is:

1. A shower steam system comprising:

a steam generator; and a spray nozzle fluidly coupled to the steam generator, the spray nozzle comprising:

a housing defining a longitudinal bore extending to an outlet, the housing including an atomizing member positioned adjacent the outlet and defining a distal end and a proximal end opposite the distal end;

an elongated member coupled to the housing in the longitudinal bore, the elongated member defining a pin at a distal end thereof, a body slidably coupled to the housing in the longitudinal bore, the body including an opening extending therethrough and defining a distal end and a proximal end opposite the distal end; and a biasing member configured to bias the body against the elongated member to a closed position by a biasing force such that the elongated member extends through the opening;

wherein the body is configured to move axially away from the elongated member toward the atomizing member in response to a pressure of a flow of water being above a threshold value so as to overcome the biasing force and allow the flow of water to pass through the opening to the atomizing member, wherein in the closed position, the body engages a step formed adjacent the pin of the elongated member at a distal end of the elongated member to limit axial movement of the body relative to the housing, wherein the elongated member includes a first portion comprising a plurality of channels extending through the first portion of the elongated member and a second portion extending from the first portion to the distal end of the elongated member, wherein the plurality of channels are configured to direct the flow of water from the inlet to the body, wherein no portion of the body contacts the first portion when the body is in the closed position, wherein the pin extends at least partially outside of the longitudinal bore defined by the housing, and wherein, in the closed position, the distal end of the body is flush with the distal end of the housing such that the pin extends entirely though a complementary portion of the opening.

2. The shower steam system of claim 1, wherein the housing further defines a step configured to limit axial movement of the body relative to the housing, such that the body is positioned relative to the atomizing member to allow the flow of water to impinge on the atomizing member and provide an atomized spray of water.

3. The shower steam system of claim 1, wherein the pin is received through the complementary portion of the opening by the biasing member in response to the pressure of the flow of water being below the threshold value.

4. The shower steam system of claim 3, wherein the pin has a tapered outer surface profile that is substantially the same as a surface profile of the body that defines the complementary portion of the opening such that there is substantially no space between the pin and the body when the biasing member biases the body against the elongated member.

5. The shower steam system of claim 1, wherein the plurality of channels extend axially through the first portion and are positioned equidistant relative to each other.

6. The shower steam system of claim 1, wherein each of the plurality of channels has the same diameter.

7. The shower steam system of claim 1, wherein a portion of the opening of the body is larger than an outer diameter of the elongated member to define a fluid channel therebetween, and wherein the fluid channel is configured to direct the flow of water to the atomizing member.

8. The shower steam system of claim 1, wherein the body includes a flange and an elongated portion extending axially away from the flange, wherein the flange includes a seal disposed circumferentially about the flange and configured to create a substantially watertight seal between the flange and the housing, and wherein the flange is configured to engage with the biasing member.

9. A shower steam system comprising:

a steam generator; and a spray nozzle coupled to the steam generator, the spray nozzle configured to receive a flow of water from a water source and to provide an atomized spray of water to the steam generator, the spray nozzle comprising:

a housing defining an inlet configured to receive the flow of water, an outlet configured to provide the atomized spray of water, a longitudinal bore extending between the inlet and the outlet, a distal end, and a proximal end opposite the distal end, the housing including an atomizing member positioned adjacent the outlet;

an elongated member coupled to the housing in the longitudinal bore, the elongated member defining a pin at a distal end thereof;

a body slidably coupled to the housing in the longitudinal bore, the body including an opening extending therethrough and defining a distal end and a proximal end opposite the distal end; and a biasing member configured to bias the body against the elongated member to a closed position by a biasing force such that the elongated member extends through the opening;

wherein the body is configured to move axially away from the elongated member toward the atomizing member in response to a pressure of the flow of water being above a threshold value to overcome the biasing force and allow the flow of water to pass through the opening, wherein in the closed position, the body engages a step formed adjacent the pin of the elongated member at a distal end of the elongated member to limit axial movement of the body relative to the housing, wherein the elongated member includes a first portion comprising a plurality of channels extending through the first portion of the elongated member and a second portion extending from the first portion to the distal end of the elongated member, wherein the plurality of channels are configured to direct the flow of water from the inlet to the body, wherein no portion of the body contacts the first portion when the body is in the closed position, wherein the pin extends at least partially outside of the longitudinal bore defined by the housing, and wherein, in the closed position, the distal end of the body is flush with the distal end of the housing such that the pin extends entirely though a complementary portion of the opening.

10. The shower steam system of claim 9, wherein the housing further defines a step configured to limit axial movement of the body relative to the housing, such that the body is positioned relative to the atomizing member to allow the flow of water to impinge on the atomizing member and provide the atomized spray of water.

11. The shower steam system of claim 9, wherein the pin is received through the complementary portion of the opening by the biasing member in response to the pressure of the flow of water being below the threshold value.

12. The shower steam system of claim 11, wherein the pin has a tapered outer surface profile that is substantially the same as a surface profile of the body that defines the complementary portion of the opening such that there is substantially no space between the pin and the body when the biasing member biases the body against the elongated member.

13. The shower steam system of claim 9, wherein the plurality of channels extend axially through the first portion and are positioned equidistant relative to each other.

14. The shower steam system of claim 9, wherein each of the plurality of channels has the same diameter.

15. The shower steam system of claim 9, wherein a portion of the opening of the body is larger than an outer diameter of the elongated member to define an annular channel therebetween, and wherein the annular channel is configured to direct the flow of water to the atomizing member.

16. The shower steam system of claim 9, wherein the body includes a flange and an elongated portion extending axially away from the flange, wherein the flange includes a seal disposed circumferentially about the flange and configured to create a substantially watertight seal between the flange and the housing, and wherein the flange is configured to engage with the biasing member.

17. A spray nozzle for a steam generator of a shower steam system, the spray nozzle comprising:

a housing defining an inlet configured to receive a flow of water from a water source, an outlet configured to provide an atomized spray of water to the steam generator, a longitudinal bore extending between the inlet and the outlet, a distal end, and a proximal end opposite the distal end, the housing including an atomizing member positioned adjacent the outlet;

an elongated member coupled to the housing in the longitudinal bore, the elongated member defining a pin at a distal end thereof;

a body slidably coupled to the housing in the longitudinal bore, the body including an opening extending therethrough and defining a distal end and a proximal end opposite the distal end; and a biasing member configured to bias the body against the elongated member by a biasing force such that the elongated member extends through the opening;

wherein the body is configured to move axially away from the elongated member toward the atomizing member in response to a pressure of the flow of water being above a threshold value to overcome the biasing force and allow the flow of water to pass through the opening, wherein the body engages a step formed adjacent the pin of the elongated member at a distal end of the elongated member to limit axial movement of the body relative to the housing, wherein the elongated member includes a first portion comprising a plurality of channels extending through the first portion of the elongated member and a second portion extending from the first portion to the distal end of the elongated member, wherein the plurality of channels are configured to direct the flow of water from the inlet to the body, wherein no portion of the body contacts the first portion when the biasing member biases the body against the elongated member, wherein the pin extends at least partially outside of the longitudinal bore defined by the housing, and wherein, in the closed position, the distal end of the body is flush with the distal end of the housing such that the pin extends entirely though a complementary portion of the opening.

18. The spray nozzle of claim 17, wherein the housing further defines a step configured to limit axial movement of the body relative to the housing, such that the body is positioned relative to the atomizing member to allow the flow of water to impinge on the atomizing member and provide the atomized spray of water.

* * * * *